(12) United States Patent
Shao et al.

(10) Patent No.: US 7,970,927 B1
(45) Date of Patent: Jun. 28, 2011

(54) CONCURRENT TRANSMIT PROCESSING

(75) Inventors: Fengyan Shao, Aliso Viejo, CA (US);
Shashank J. Pandhare, Pune (IN); Ying Ping Lok, Ladera Ranch, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 77 days.

(21) Appl. No.: 12/651,270

(22) Filed: Dec. 31, 2009

(51) Int. Cl.
*G06F 15/16* (2006.01)
(52) U.S. Cl. .................. 709/234; 709/250; 709/232
(58) Field of Classification Search .............. None
See application file for complete search history.

(56) References Cited

U.S. PATENT DOCUMENTS

| 5,047,917 | A | * | 9/1991 | Athas et al. ............... 719/314 |
| 5,136,582 | A | * | 8/1992 | Firoozmand ............... 370/400 |
| 5,488,724 | A | * | 1/1996 | Firoozmand ............... 709/212 |
| 5,873,089 | A | * | 2/1999 | Regache ...................... 1/1 |
| 6,101,533 | A | * | 8/2000 | Brandt et al. ............... 709/213 |
| 6,526,451 | B2 | * | 2/2003 | Kasper ....................... 709/250 |

* cited by examiner

*Primary Examiner* — John B. Walsh
(74) *Attorney, Agent, or Firm* — Klein, O'Neill & Singh, LLP

(57) ABSTRACT

A method and system for concurrent processing transmit requests uses transmit queue including a circular buffer and a queue state including a producer index, a consumer index, and a producer list. Producer processes write to the circular buffer concurrently. The producer list signals which portion of the circular buffer are allocated to each of the producer processes.

20 Claims, 7 Drawing Sheets

CONCURRENT TRANSMIT PROCESSING

BACKGROUND

1. Technical Field

This disclosure relates to networking systems.

2. Related Art

Computer networks commonly are used to transfer information to and from computing systems. Network adapters or interface cards are commonly used to receive network information (as packets or frames) from other network devices and systems and forward the information to a computing system. Network adapters are also used to transfer information from a computing system to other network devices and systems.

Typically, network adapters use buffers (memory storage modules) to handle network traffic. Receive buffers are used to temporarily store network information received by a network adapter, and transmit buffers are used to temporarily store information that is sent by a computing system via the network adapter. Accessing transmit or receive buffers may present a bottleneck and limit the speed at which data may be transferred through a network adapter.

Network adapters today can transfer data over a network link at very high rates, for example, 10 gigabits per second (10 G). Additionally, high-performance computing systems today often include multiple processors. As network adapter transfer speeds increase, there is a need for efficient buffer management in network adapters to permit combined use of high speed network adapters with multiple processors.

SUMMARY

In one embodiment, a method for processing of requests for transmission of data to a network is provided. The method includes receiving a request for transmission of data; allocating space in a buffer based on the size received request for transmission of data, where the allocation space comprises: updating a producer list associated with the buffer to indicate the allocated space; writing data of the request for transmission to the allocated space in the buffer; updating the producer list to signal completion of the writing data.

In another embodiment, a system for concurrent processing of requests for transmission of data to a network is provided. The system includes a buffer for storage of data to be transmitted to at least one network, the buffer associated with a consumer index indicating where data may be read from the buffer, a producer index indicating where data has been written to the buffer, and a producer list indicate of ongoing writes to the buffer; a network adapter configured to consume the data from the buffer and transmit the data to the at least one network; at least one processor configured to supply data to the buffer, where the process supplies data to the buffer by receiving a request for transmission of data; allocating space in a buffer based on the size received request for transmission of data, where the allocation space comprises: updating the producer list to indicate the allocated space; writing data of the request for transmission to the allocated space in the buffer; updating the producer list to signal completion of the writing data.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the disclosure will now be described with reference to the drawings of the various embodiments. In the drawings, the same components have the same reference numerals. The illustrated embodiments are intended to illustrate, but not to limit the disclosure. The drawings include the following figures.

DETAILED DESCRIPTION

To facilitate an understanding of the various embodiments, the general architecture and operation of a computing system is first described. The specific architecture and operation of the various embodiments will then be described with reference to the general architecture.

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1A:
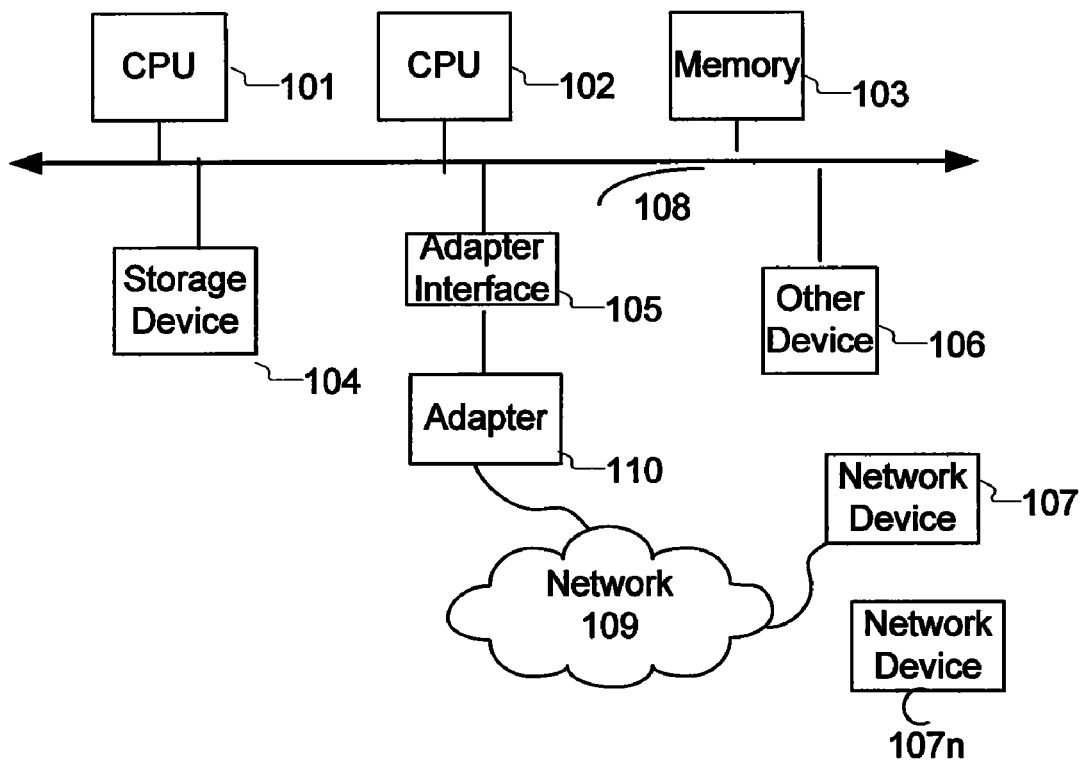
FIG. 1A shows a block diagram of the internal functional architecture of a computing system for use with an embodiment of the current disclosure.

FIG. 1 shows a block diagram of the internal functional architecture of a computing system that may be used to implement various aspects of the current disclosure. The computing system may include a first and second central processing units (CPUs) 101, 102 that interface with a bus. Each of the CPUs 101, 102 may be a general-purpose processor or another type of processor. Processors 101, 102 interface with a bus 108 and execute programmable instructions out of memory 103. Bus 108 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

The computing system also includes a storage device 104 that interfaces through the bus 108 or otherwise. The storage device 104 may include disks, tapes, drums, integrated circuits, or the like, operative to hold data by any means, including magnetically, electrically, optically, and the like. In one embodiment, the storage device 104 stores operating system program files, application program files, and other files. For example, the first CPU 101 and the second CPU 102 may, independently or in combination, execute computer-executable process steps of an application program so that they may properly execute the application program.

The computing system also includes a memory (for example, random access memory (RAM)) 103 that interfaces with the bus to provide the CPUs 101, 102 with access to memory storage. When executing stored computer-executable process steps from the storage device 104, the CPUs 101, 102 store and execute the process steps out of the memory 103.

The computing system also includes other devices 106. The other devices may include, for example, video graphics and sound generation hardware.

The computing system includes a network adapter 110 that is coupled to bus 108 through an adapter interface 105 and then to other components of the computing system. The network adapter 110 may be connected to other systems, for example, network devices 107a-107n, through a network 109. The network adapter 110 may be adapted to one or more of a wide variety of networks, including local area networks, storage area networks, wide area networks, server networks, the Internet, and the like. The adapter 36 may be configured to handle both network and storage traffic.

Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a SAN. This functionality would allow Fibre Channel to leverage 10 Gigabit Ethernet networks while preserving the Fibre Channel protocol. The adapter 110 shown in FIG. 1 may be configured to operate as a FCOE adapter and may be referred to as FCOE adapter 110. QLogic Corporation, the assignee of the present application, provides one such adapter. Those of ordinary skill in the art will appreciate, however, that the present embodiments are not limited to any particular protocol. The illustrated adapter 110 is merely one example of a converged network adapter that may leverage the advantages of the present embodiments.

Figure 1B:
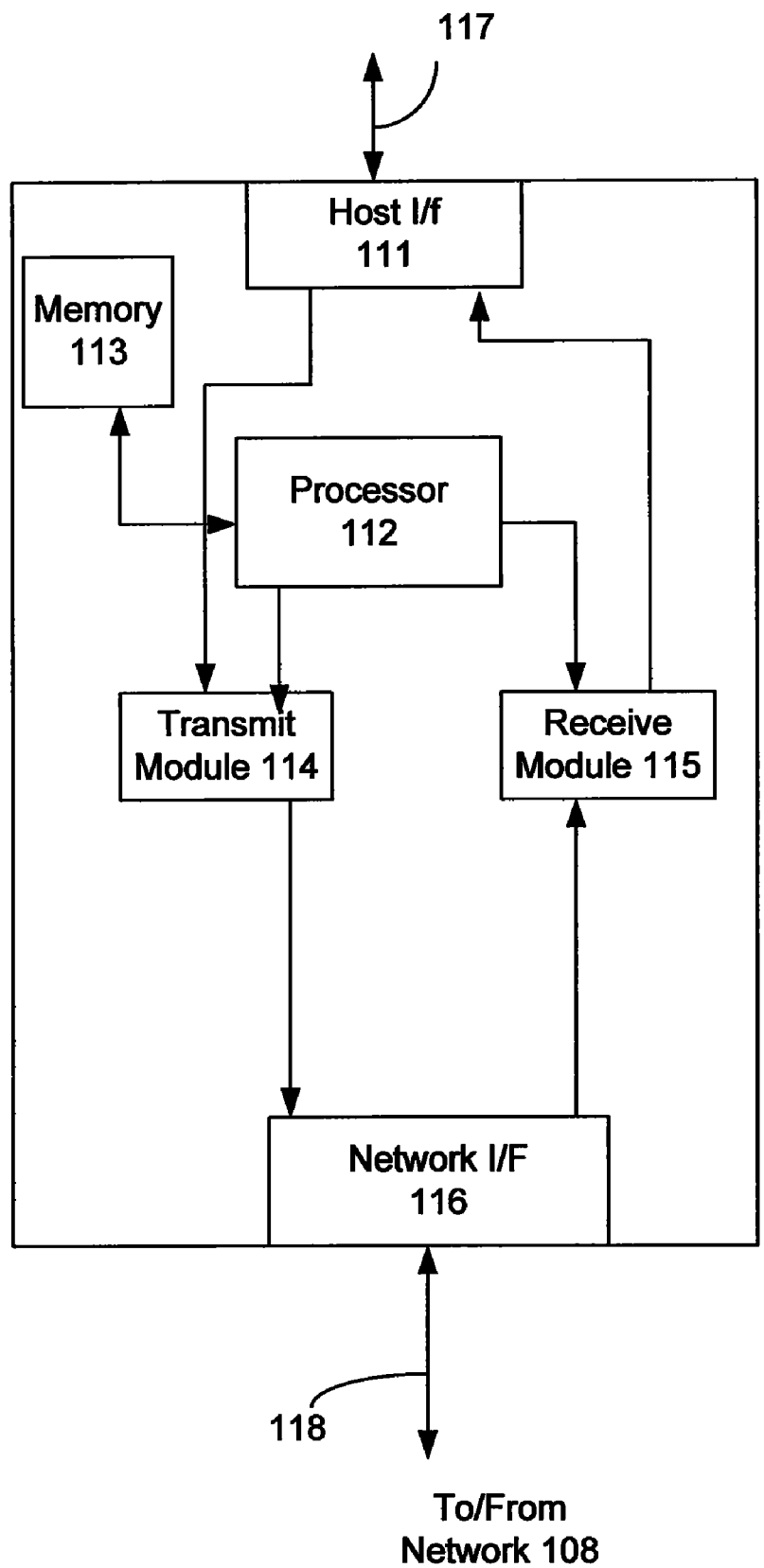
FIG. 1B shows a block diagram of an adapter, used according to one embodiment.

FIG. 1B shows a block diagram of adapter 110 (may also be referred to as network adapter 110), used according to one embodiment. Adapter 110 includes a processor 112 that may execute firmware instructions out of memory 113 for controlling overall adapter 110 functionality. A host interface 111 interfaces with computing system 100 via interconnect 117. The structure and design of interface 111 depends on the type of interconnect. For example, if interconnect 117 is a PCI-Express link, then host interface 111 includes logic and circuitry to handle PCI-Express based traffic. The embodiments herein are not limited to any particular interconnect type.

Adapter 110 includes a transmit module 114 for handling transmit traffic from adapter 110. The transmit traffic is sent by computing system 100. Transmit module 114 may include memory buffers (not shown) for storing transmit packets.

Adapter 110 also includes a receive module 115 that processes network information received from network 108 via link 118. Receive module 115 may also include memory buffers for temporarily storing network information that is received from network 108, before the information is sent to computing system 100.

Adapter 110 further includes a network interface 116. The design and structure of interface 116 depends on the network protocol and network link 118. For example, to handle FCOE traffic, interface 116 will have logic and circuitry to send and receive FCOE packets. Similarly, where adapter 110 is an Ethernet, Fibre Channel or any other type of adapter, then it will have the necessary structure and design to handle the relevant protocol/standard.

Figure 2:
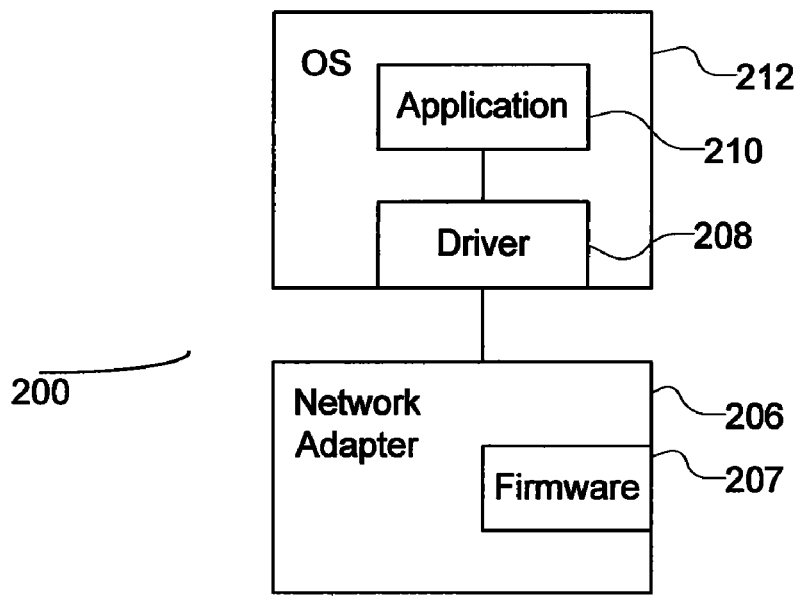
FIG. 2 shows a block diagram of an architecture used by a computing system to perform data transfer over a network according to an embodiment of the current disclosure.

FIG. 2 is block diagram of an architecture 200 used by a computing system for data transfer over a network. Architecture 200 includes an operating system 212 and a network adapter 206 (similar to adapter 110) that couples to a network for data transfer. Device driver 208 and an application program 210 may also be executed within the operating system 212.

The network adapter 206 executes firmware 207 that communicates with the device driver 208. The device driver 208 in turn communicates with the application program 210. In one embodiment, the application program 210 may communicate with the kernel part of the operating system 212. Additionally, the device driver 208 may be part of the operating system kernel.

Operating system 212 may be a Windows based Linux based operating system, Solaris, Unix and others. Operating system 212 provides an interface between application programs 210 and adapter 206 (similar to adapter 110). For example, operating system 212 may be used to schedule tasks, allocate storage, and handle the interface to peripheral hardware, such as hard drives, optical disk drives, tape drives, network adapters, and the like. The operating system may be split into a kernel and various system programs. The system programs use facilities provided by the kernel to perform higher-level tasks.

Operating system 212 interfaces with application programs, for example, 210 for performing certain operations. For example, application program 210 may transmit a request to access peripheral hardware, for example, adapter 206. This request is received by the operating system 212, which in turn translates the request to a format useable by the device.

To facilitate network communication, the operating system 212 may execute a set of programs known as a network protocol stack. The nature and structure of the protocol stack would depend on the protocol that is being used for network communication.

Device driver 208 includes processor executable instructions used to control a peripheral device, for example, adapter 206. The device driver is usually a routine or set of routines that implements device-specific aspects of generic input/output operations. The device driver may be responsible for accessing hardware registers of adapter 206 starting and completing input/output operations, performing error processing, and often includes an interrupt handler to service interrupts generated by the adapter 206. Device drivers are typically kernel mode drivers and often form part of the lowest level of an operating system kernel.

To transfer data between a CPU to the network adapter 206, one or more buffers (each with a plurality of memory locations) are used to temporarily store data packets. Such buffers are also commonly termed queues. In a receive path (i.e., data packets received form the network adapter), receive buffers are used. In a transmit path (i.e., data packets sent to the network adapter) transmit buffers are used. A completion buffer may be also used to post status when an I/O operation is complete. Usually, the device driver 208 abstracts hardware specificity and interfaces with the operating system 212. The device driver 208 may also allocate buffers.

FIGS. 3A-3F show a transmit queue processing for transmitting data from a network adapter, according to an embodiment of the disclosure. The Figures vary in the illustrated status of the transmit queue. The transmit queue includes a circular buffer 301. In some embodiments, the transmit queue includes other buffer types. The circular buffer includes a plurality of buffer locations 301A-301N. Although the circular buffer 301 is shown with eighteen buffer locations, those skilled in the art will appreciate that the circular buffer may be implemented with a different number of buffer locations and commonly has many more locations.

Each of the buffer locations includes a plurality of memory locations and may hold one input/output control block (IOCB). An IOCB is a unit of data passed between the device driver and the network adapter. In one embodiment, the memory locations of the transmit buffer are in the main memory of a computer system, for example, the random access memory 103 of the system shown in FIG. 1. Such memory may be termed host memory. In other embodiments, the memory locations of the transmit buffer may be located in the network adapter or a combination of network adapter memory and host memory may be used.

The transmit queue includes a queue state that signals the status of the queue such as which buffer locations are in use or allocated for use. The queue state includes a producer index 313 and a consumer index 311. Each index is incremented in a circular or modulo manner as it is used. The producer index 313 points to the first empty location in the circular buffer 301, and the consumer index 311 points to the first full location in the circular buffer 301. Generally, a producer, for example, driver software begins writing the circular buffer 301 at the location indicated by the producer index 313 and withholds writing to the circular buffer 301 when the buffer is full, that is, when an increment of the producer index 313 would cause it to match the consumer index 311. Similarly, a consumer, for example, the network adapter, begins reading from the circular buffer 301 at the location indicated by the consumer index 311 and ends reading from the circular buffer 301 when the buffer is empty, that is, when the consumer index 311 and the producer index 313 point to the same buffer location.

The queue state also includes a producer list 321. Each of possibly many multiple concurrent processes writing to the transmit queue uses an entry in the producer list. Accordingly, the number of entries in the producer list 321 increases and decreases as producer processes start and finish. The producer list entry associated with a process points to the location that a next process may begin writing to the circular buffer 301. The producer list entry is essentially a value for the producer index 313 after the associated process finishes writing to the circular buffer 301. The producer list 321 is a doubly linked list in the illustrated embodiment. The doubly linked list is used in managing the producer list 321. Other list structures may be used in other embodiments.

The producer list 321 is used to facilitate concurrent processes writing to the transmit queue. To further facilitate concurrency, the queue state includes a lock, for example, a semaphore to allow changes to the queue state by one process without interference by another process. Notably, the queue may be managed by concurrent processes that have locked queue access for updating the queue state but not for writing the circular buffer. In one embodiment, the values of the queue state are stored in host memory. In other embodiments, the queue state may be in storage of the network adapter or a combination of the network adapter and host memory, for example, storing the consumer index and producer index in the network adapter and the producer list in host memory.

A few examples of transmit queue status will further explain operation of the transmit queue. In a first exemplary transmit queue status illustrated in FIG. 3A, the queue is empty and no producers are writing to the circular buffer 301. Accordingly, the producer index 313 and the consumer index 311 point to the same buffer location, and the producer list 321 has a single, null entry.

Figure 3A:
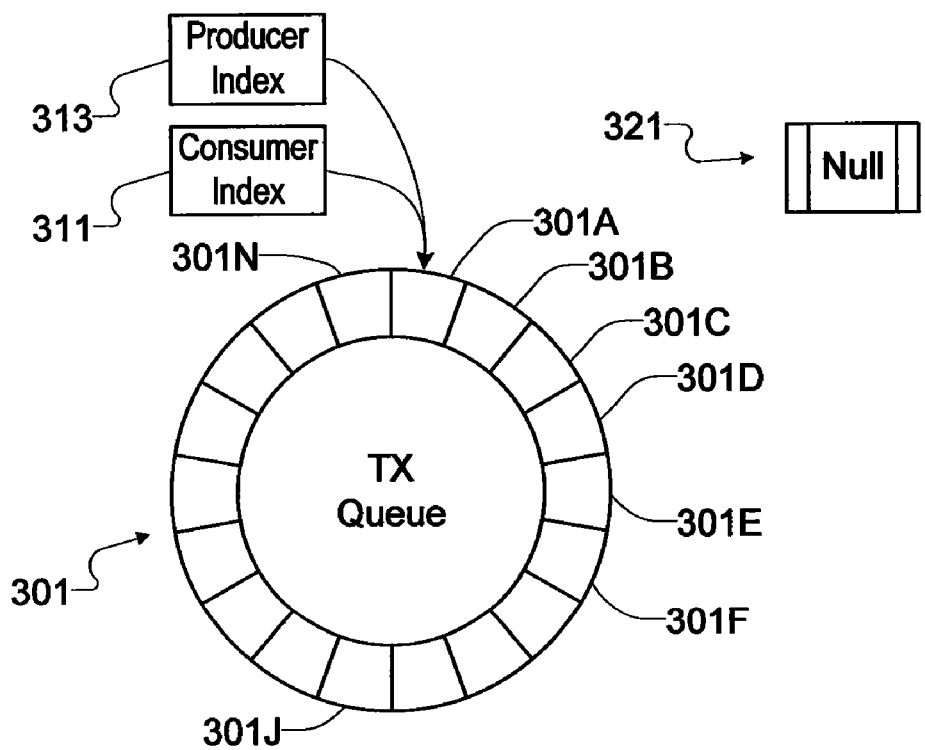
FIGS. 3A-3F show examples of a transmit queue according to an embodiment of the current disclosure.
Figure 3B:
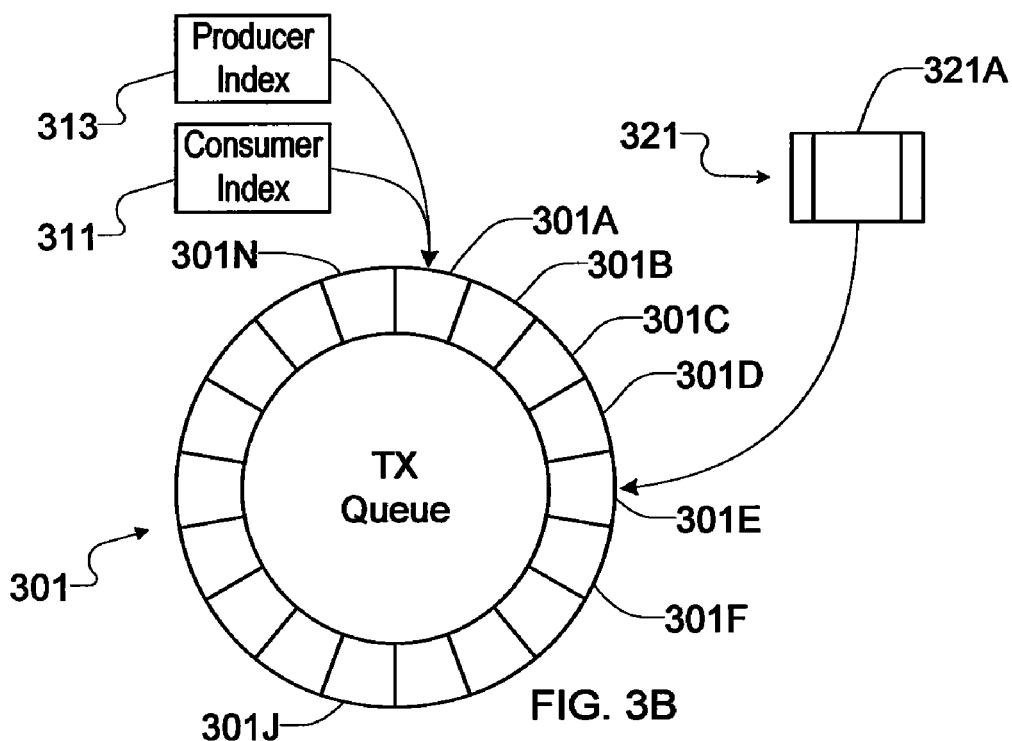

In a second exemplary transmit queue status illustrated in FIG. 3B, the queue is empty and a single producer process is writing a transmit request to the circular buffer 301. Accordingly, the producer index 313 and the consumer index 311 point to the same buffer location, and the producer list 321 has a single entry 321A. The producer list entry points to the location at which a second producer process would begin writing to the buffer. The queue is empty in the sense that it does not contain a transmit request for a consumer to process; however, the queue may contain portions of the transmit request being written by the single producer process.

Figure 3C:
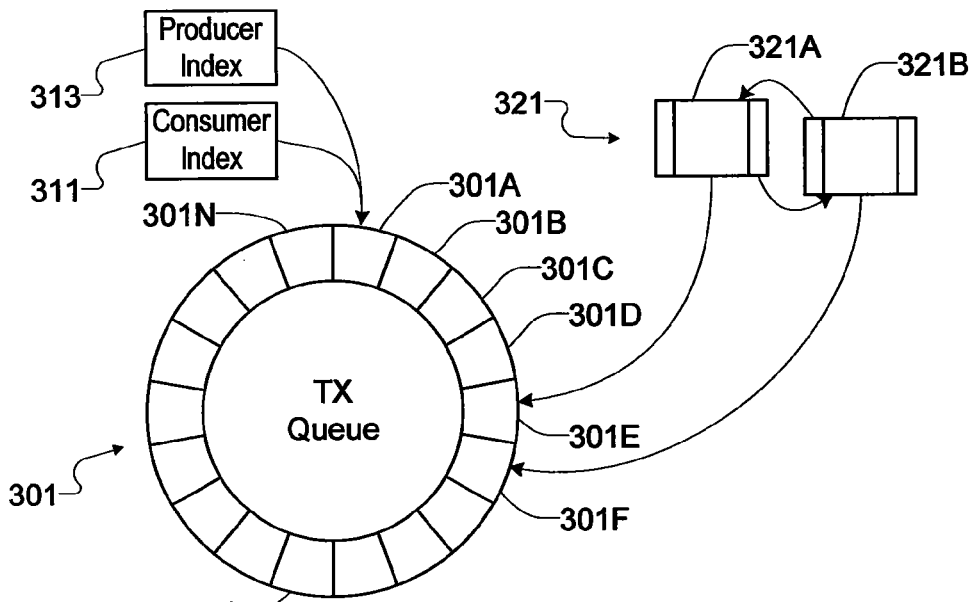

In a third exemplary transmit queue status illustrated in FIG. 3C, the queue is empty and two producer processes are writing transmit requests to the circular buffer 301. Accordingly, the producer index 313 and the consumer index 311 point to the same buffer location, and the producer list 321 has two entries. The first entry 321A of the producer list points to the location at which the second producer process begins writing to the buffer, and the second entry 321B of the producer list points to the location at which a third producer process would begin writing to the buffer.

Figure 3D:
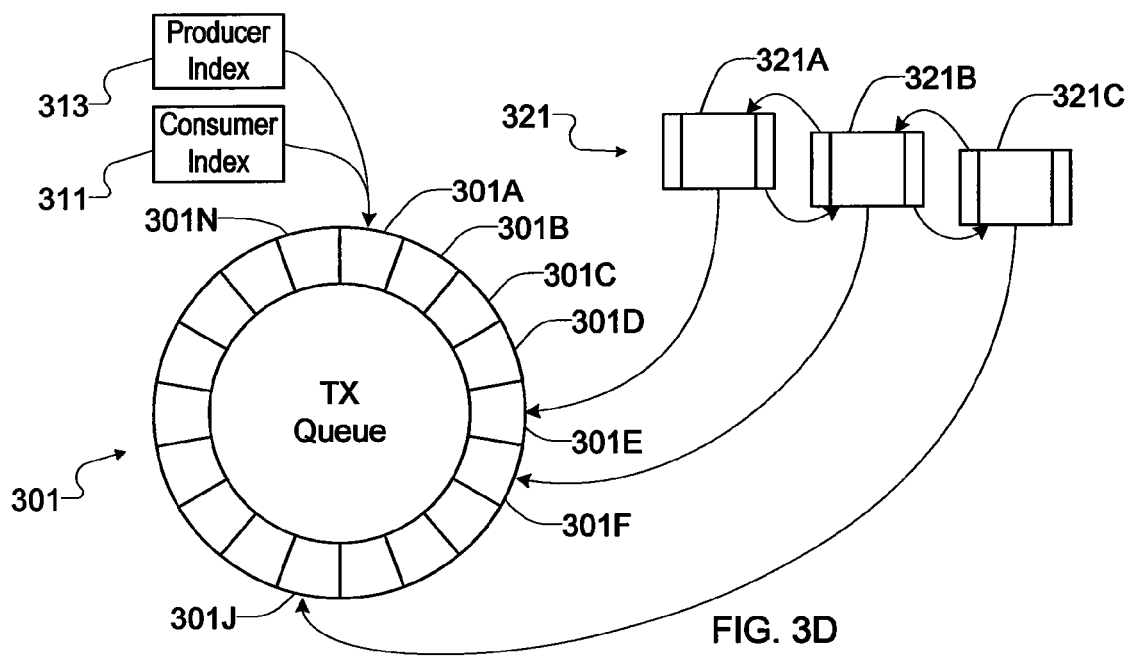
Figure 3E:
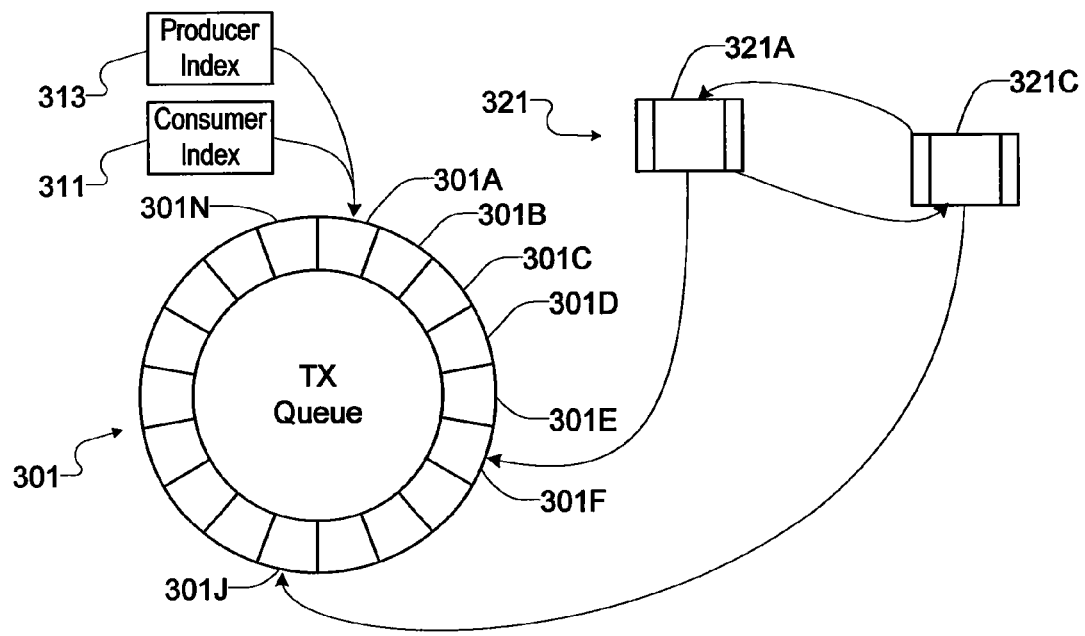
Figure 3F:
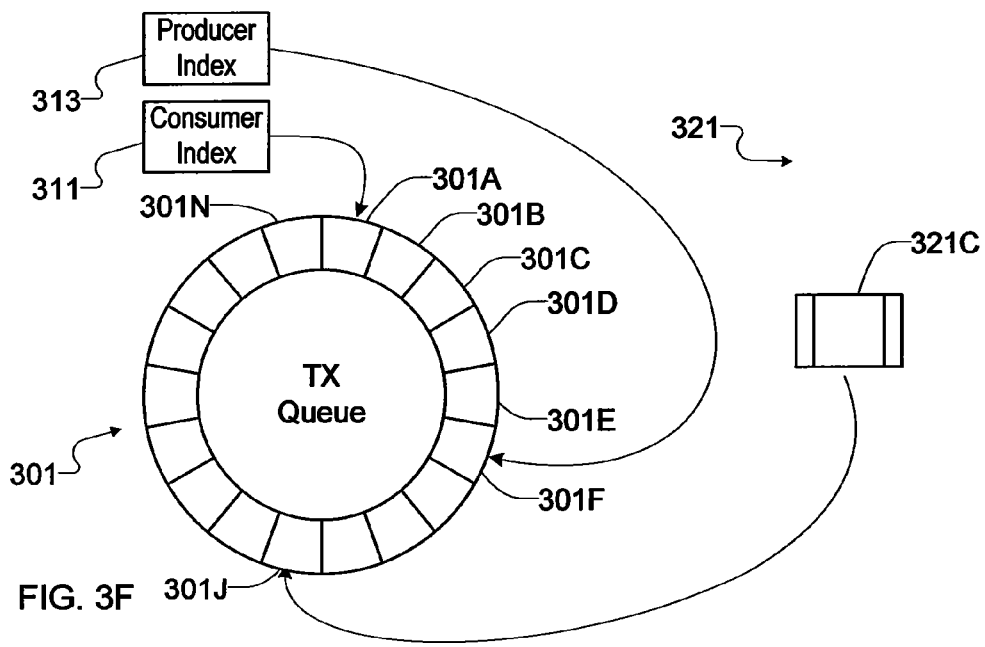
Figure 4:
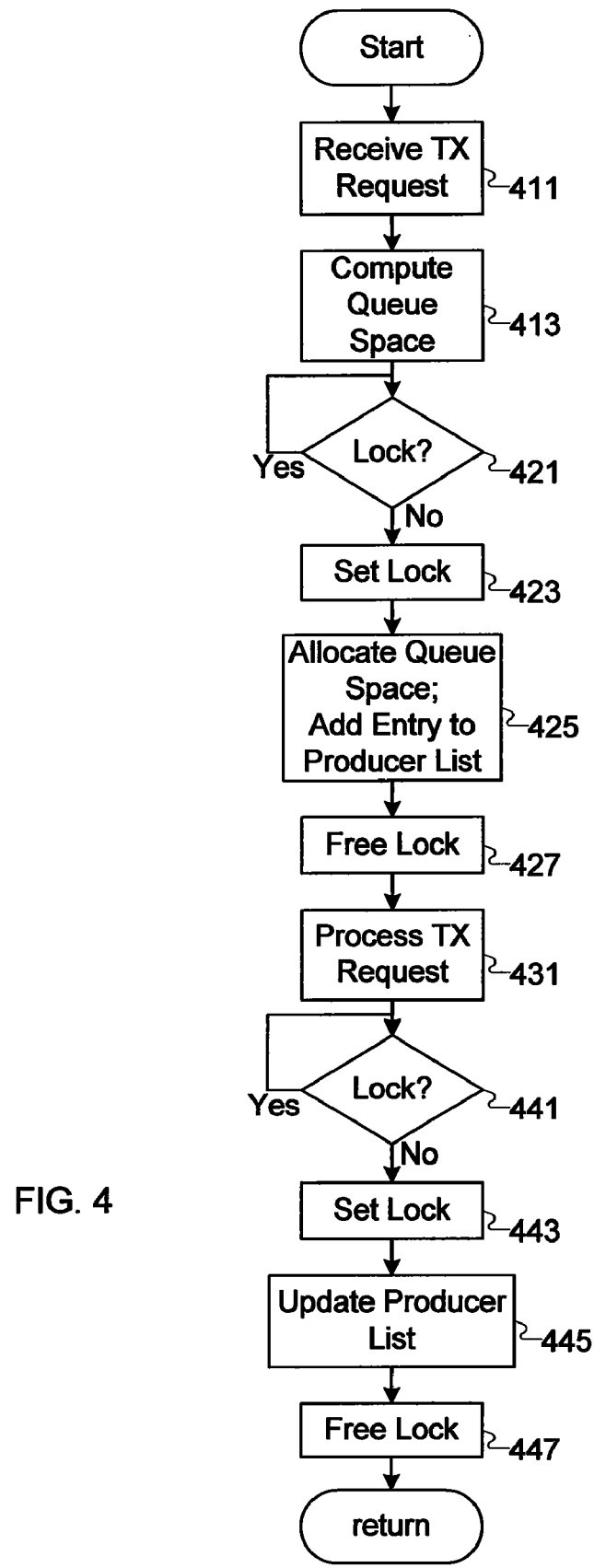
FIG. 4 shows a flowchart of a process for concurrent transmit processing according to an embodiment of the current disclosure.

FIG. 4 is flowchart of a process for concurrent writing to a transmit queue. The process may be implemented by a computing system such as the system of FIG. 1. The process may be implemented with software, hardware, or a combination of hardware and software. Executable instructions associated with the process may be considered a driver. The process is generally performed in multiple instances concurrently. For example, one instance of the process may be performed by the first CPU 101 of the computing system of FIG. 1 while a second instance of the process is performed by the second CPU 102 of the computing system of FIG. 1. Additionally, one CPU may perform multiple instances of the process concurrently, for example, using multithreading. Multiple instances of the process use a shared transmit queue such as the queue illustrated in FIGS. 3A-3F.

The process begins in block 411. In block 411, the process receives a transmit request. The transmit request may be supplied to the process by, for example, by an application executed by a computing system. In block 413, the process computes the queue space required for the transmit request received in block 411. The space is computed as a number of buffer locations, for example, a number of I/O control blocks.

In block 421 the process tests whether access to the queue is locked. Access to the queue may be locked when another process is accessing the queue. The process may use a semaphore or comparable scheme for queue locking. If the queue is locked, the process remains in block 421; otherwise, the process continues to block 423.

In block 423 the process sets the queue lock. Setting the queue lock allows uninterrupted access to the queue state and avoids problems such as multiple processes updating parts of the queue state to inconsistent status. In some embodiments, the process performs the lock testing of block 423 and the lock setting of block 423 in a combined test-and-set operation.

In block 425 the process allocates transmit queue space by adding an entry to the producer list. The added producer list entry points to the circular buffer location where a next transmit request may begin writing. For example, if the preceding producer list entry points to a location N and the process computed in step 413 that the transmit request requires L buffer locations, the added producer list entry points to location N+L in the circular buffer. If the added producer list entry is the first entry in the producer list, the process computes the location pointed to by the added entry using the producer index rather than the preceding producer list entry.

In block 427, the process frees the queue lock. Freeing the lock is the inverse of the queue locking performed in block 423.

In block 431, the process processes the transmit request received in 411. The processing includes writing to the transmit queue space allocated in block 425. Additionally, processing the transmit request may include translating the request from a native format specified by the operating system to a format defined by the network adapter. If an error is detected during the translation, the process may mark the buffer entry as invalid to signal the network adapter to drop the packet. The amount of processing in block 425 and correspondingly the time required is generally large in comparison to other blocks of the process. Thus, the ability of multiple processes to perform this block concurrently allows substantial parallel processing performance gain.

In block 441 the process tests whether access to the queue is locked. The process for this block is similar to or the same as the test performed in block 421. If the queue is locked, the process remains in block 441; otherwise, the process continues to block 443. In block 443 the process sets the queue lock. The process for this block is similar to or the same as the lock setting performed in block 423.

In block 445 the process updates the producer list. Depending on the state of the producer list, the producer index may also be updated. When the process's entry in the producer list is the first entry in the list, the producer index is updated to point to the location pointed to by the process's entry in the producer list. When the process's entry in the producer list is not the first entry in the list, the producer index is not updated; instead, the process updates the producer list by updating the prior entry pointer to match its pointer. In both cases, the process also removes its entry from the producer list. The process may remove its entry from the producer list by changing pointers in the preceding and following producer list entries.

In block 447, the process frees the queue lock. Free the lock is the inverse of the queue locking performed in block 443. Thereafter the process returns.

Figure 5:
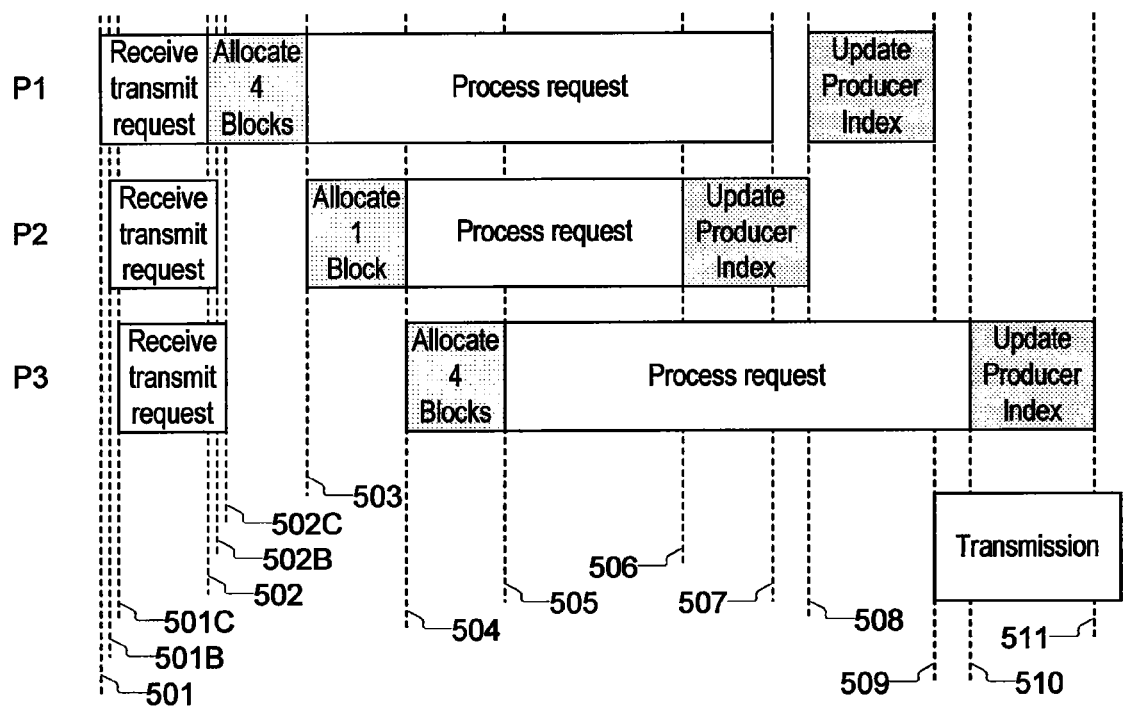
FIG. 5 shows an exemplary time line of concurrent transmit processing according to an embodiment of the current disclosure.

Operation of concurrent processes according to FIG. 4 may be further understood with reference to the example timeline shown in FIG. 5 and corresponding transmit queue statuses shown in FIGS. 3A-3F. The times shown in FIG. 5 are not to scale but rather serve to illustrate an example sequence of events. Three producer processes P1, P2, P3 are illustrated. Each of the processes writes to a common transmit queue according to the process illustrated in FIG. 4.

The exemplary timeline begins time 501 where none of the producer processes P1, P2, P3 are writing to the transmit queue. The corresponding queue status is illustrated in FIG. 3A with the queue empty and accordingly the producer index 313 and the consumer index 311 point to the same buffer location, and the producer list 321 has a single, null entry. Beginning at time 501, producer process P1 receives a first transmit request according to block 411 and calculates the queue space required for the first transmit request according to block 413. At time 501B that is shortly after time 501, producer process P2 receives a second transmit request and calculates the queue space required for the second transmit request. Shortly thereafter, at time 501C, producer process P3 receives a third transmit request and calculates the queue space required for the third transmit request.

At a second time 502, producer process P1 finishes computing the queue space required for the first transmit request and is ready to allocate the required space in the queue. Producer process P1 initially tests whether the queue is locked according to block 421. Producer process P1 is the first process in the example timeline of FIG. 5 to be ready to write to the queue, accordingly the queue is not locked, and producer process P1 is able to update the queue state. Producer process P1 sets the queue lock according to block 423 to establish its sole access to the queue state. Producer process P1 then allocates the queue space according to block 425. At time 503, producer process P1 has allocated four buffer locations and the queue status is as shown in FIG. 3B. Relative to the initial queue status of FIG. 3A, the queue status in FIG. 3B include a producer list entry 321A associated with producer process P1. The entry points to buffer location 301E, which is the location where a following transmit request may begin in the buffer. After allocating its buffer space, producer process P1 unlocks the queue according to block 427. Producer process P1 then writes the first transmit request to the queue using locations from the location (301A) pointed to by the producer index 313 up to the location (301E) pointed to by the producer list entry 321A.

Producer process P2 finishes receiving the second transmit request and calculating the queue space required at time 502B, shortly after time 502. Producer process P2 then tests whether the queue is locked according to block 421. Since time 502B is after time 502 when producer process P1 locked the queue, producer process P2 waits for the lock to be released. Similarly, producer process P3 finishes receiving the third transmit request and calculating the queue space required at time 502C, shortly after time 502B, tests that the queue is locked, and also waits for the lock to be released.

At time 503, after producer process P1 unlocks the queue, producer process P2 proceeds to relock the queue and allocate the queue space required for the second transmit request. At time 504, producer process P2 has allocated one buffer location and the queue status is as shown in FIG. 3C. Relative to the second queue status of FIG. 3B, the queue status in FIG. 3C includes a second producer list entry 321B associated with producer process P2. The entry points to buffer location 301F, which is the location where a following transmit request may begin in the buffer. After allocating its buffer space, producer process P2 unlocks the queue. Producer process P2 then writes the second transmit request to the queue using locations from the location (301E) pointed to by the preceding producer list 321A entry up to the location (301F) pointed to by the second producer list entry 321B.

At time 504, after producer process P2 unlocks the queue, producer process P3 proceeds to relock the queue and allocate the queue space required for the third transmit request. At time 505, producer process P3 has allocated four buffer locations and the queue status is as shown in FIG. 3D. Relative to the third queue status of FIG. 3C, the fourth queue status in FIG. 3D includes a third producer list entry 321C associated with producer process P3. The entry points to buffer location 321J, which is the location where a following transmit request may begin in the buffer. After allocating its buffer space, producer process P3 unlocks the queue. Producer process P3 then writes the third transmit request to the queue using locations from the location (301F) pointed to by the preceding producer list entry 321B up to the location (321J) pointed to by the third producer list entry 321C.

At time 506 in the illustrated timeline, producer process P2 finishes writing the second transmit request to the buffer and is ready to update the queue state. Producer process P2 initially tests whether the queue is locked according to block 441. In the example timeline, no other process is updating the queue state so the queue is not locked, and producer process P2 is able to update the queue state. Producer process P2 sets the queue lock according to block 443 to establish its sole access to the queue state. Producer process P2 then updates the queue state according to block 445. Since the entry (321B) in the producer list associated with producer process P2 is not the first entry in the producer list, the producer index 313 is not updated. Instead, producer process P2 updates the preceding producer list entry 321A to match the entry associated with P2. The entry associated with producer process P2 is removed from the producer list. At time 508, producer process P2 completes updating the queue state and the queue has a fifth status shown in FIG. 3E. Relative to the fourth queue status of FIG. 3D, the fifth queue status in FIG. 3E has two entries in the producer list, one entry (321A) associated with producer process P1 that now points to location 301F and one entry (321C) associated with producer process P3 that points to location 301J. The producer index 313 continues pointing to the same buffer location (301A) as the consumer index 311. Thus, a consumer cannot begin transmitting the second transmit request and requests are not transmitted out of order. After updating the buffer state, producer process P2 unlocks the queue according to block 447.

At time 507 in the illustrated timeline, producer process P1 finishes writing the first transmit request to the buffer and is ready to update the queue state. Producer process P1 initially tests whether the queue is locked. Since time 507 is after time 506 when producer process P2 locked the queue, producer process P1 waits for the lock to be released. At time 509, producer process P2 unlocks the queue as described above. Producer process P1 then proceeds to relock the queue and update the queue state to reflect that it has finished writing the first transmit request to the queue. Since the entry (321A) in the producer list associated with producer process P1 is the first entry in the producer list, the producer index 313 is updated to point to the location (301F) pointed to the first entry in the producer list. The entry associated with producer process P1 is removed from the producer list. At time 509, producer process P1 completes updating the queue state and the queue has a sixth status shown in FIG. 3F. Relative to the fifth queue status of FIG. 3E, the sixth queue status in FIG. 3F has one entry (321C) in the producer list 321 associated with producer process P3 that points to location 301J. The producer index 313 is updated to the point to location 301F. Since the producer index 313 and consumer index 311 are now different, a network adapter may now begin transmitting from the queue. After updating the queue state, producer process P1 unlocks the queue.

At time 510 in the illustrated timeline, producer process P3 finishes writing the third transmit request to the buffer and is ready to update the queue state. Producer process P3 initially tests whether the queue is locked and it is not in the illustrated timeline. Producer process P3 proceeds to lock the queue and update the queue state to reflect that it has finished writing the third transmit request to the queue. Since the entry (321C) in the producer list 321 associated with producer process P3 is the first entry in the producer list, the producer index 313 is updated to point to the location (301J) pointed to the first entry in the producer list. The entry associated with producer process P3 is removed from the producer list. At time 511, producer process P3 completes updating the queue state and the queue has a seventh status. The seventh queue status has a single null entry in the producer list 321 and the producer index 313 is updated to point to location 301J. Additionally, the consumer index 311 may have incremented as the network adapter consumes transmit requests from the queue. After updating the queue state, producer process P3 unlocks the queue.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A method for processing requests for transmission of data from a computing system to a network via a network adapter, the method comprising:
   (a) receiving a request for transmission of data; wherein a network driver executed by a computing system processor receives the request;
   (b) acquiring a lock to a transmit queue having a plurality of buffers, wherein the network driver places the lock;
   (c) allocating space in a buffer from among the plurality of buffers, based on a size of the received request for transmission of data by updating a producer list associated with the buffer to indicate the allocated space; wherein the producer list is updated by adding an entry to the producer list, the entry pointing to a location in the buffer that may be used by a next request for transmission of data; and wherein the network driver allocates space and updates the producer list;

(d) releasing the lock to the transmit queue;

(e) writing data for the request for transmission to the allocated space in the buffer; and (f) updating the producer list to signal completion of the writing data by deleting the entry in the producer list associated with the completed request for transmission of data.

2. The method of claim 1, wherein, when the producer list is empty, the location in the buffer that may be used by a next request for transmission of data is set to be a number of locations from the location pointed to by a producer index, the number of locations matching the size of the allocated space.

3. The method of claim 1, wherein when the producer list is not empty, the location in the buffer that may be used by a next request for transmission of data is set to be a number of locations from the location pointed by the last entry in the producer list, the number of locations matching the size of the allocated space.

4. The method of claim 1, wherein when the entry deleted from the producer list is the first entry in the producer list, the producer index is updated to point to the location pointed to by the deleted entry.

5. The method of claim 1, wherein when the entry deleted from the producer list is not the first entry in the list, the preceding entry in the producer list is updated to point to the location that was pointed to by the deleted entry.

6. The method of claim 1, further comprising processing data of the request for transmission, and writing the processed data to the allocated space in the buffer.

7. A system for concurrent processing of requests for transmission of data to a network, the system comprising:

a processor configured to supply data to a buffer from among a plurality of buffers of a transmit queue; wherein the buffer is used for storage of data to be transmitted to at least one network and the buffer is associated with (i) a consumer index indicating where data may be read from the buffer, (ii) a producer index indicating where data has been written to the buffer, and (iii) a producer list indicating ongoing writes to the buffer; and a network adapter configured to consume the data from the buffer and transmit the data to the at least one network;

wherein a network driver executed by the processor receives a request for transmission of data; places a lock on the transmit queue, allocates space in a buffer based on the size of the received request for transmission of data, updates the producer list to indicate the allocated space and then releases the lock on the transmit queue; writes data of the request for transmission to the allocated space in the buffer; and updates the producer list to signal completion of the writing data.

8. The system of claim 7, wherein the producer list is updated by adding an entry to the producer list, the entry pointing to a location in the buffer that may be used by a next request for transmission of data.

9. The system of claim 8, wherein when the producer list is empty, the location in the buffer that may be used by a next request for transmission of data is set to be a number of locations from the location pointed to by the producer index, the number of locations matching the size of the allocated space.

10. The system of claim 8, wherein when the producer list is not empty, the location in the buffer that may be used by a next request for transmission of data is set to be a number of locations from the location pointed by the last entry in the producer list, the number of locations matching the size of the allocated space.

11. The system of claim 7, wherein the updating the producer list to signal completion of the writing data comprises deleting the entry in the producer list associated with the completed request for transmission of data.

12. The system of claim 11, wherein when the entry deleted from the producer list is the first entry in the producer list, the producer index is updated to point to the location pointed to by the deleted entry.

13. The system of claim 11, wherein when the entry deleted from the producer list is not the first entry in the list, the preceding entry in the producer list is updated to point to the location that was pointed to by the deleted entry.

14. A computing system operationally coupled to a network via a network adapter, comprising:

a processor configured to supply data to a buffer from among a plurality of buffers of a transmit queue;

wherein the buffer is used for storage of data to be transmitted to at least one network device and the buffer is associated with (i) a consumer index indicating where data may be read from the buffer, (ii) a producer index indicating where data has been written to the buffer, and (iii) a producer list indicating ongoing writes to the buffer; and wherein a network driver executed by the processor receives a request for transmission of data; places a lock on the transmit queue, allocates space in a buffer based on the size of the received request for transmission of data, updates the producer list to indicate the allocated space and then releases the lock on the transmit queue; writes data of the request for transmission to the allocated space in the buffer; and updates the producer list to signal completion of the writing data.

15. The computing system of claim 14, wherein the producer list is updated by adding an entry to the producer list, the entry pointing to a location in the buffer that may be used by a next request for transmission of data.

16. The computing system of claim 15, wherein when the producer list is empty, the location in the buffer that may be used by a next request for transmission of data is set to be a number of locations from the location pointed to by the producer index, the number of locations matching the size of the allocated space.

17. The computing system of claim 15, wherein when the producer list is not empty, the location in the buffer that may be used by a next request for transmission of data is set to be a number of locations from the location pointed by the last entry in the producer list, the number of locations matching the size of the allocated space.

18. The computing system of claim 14, wherein the updating the producer list to signal completion of the writing data comprises deleting the entry in the producer list associated with the completed request for transmission of data.

19. The computing system of claim 18, wherein when the entry deleted from the producer list is the first entry in the producer list, the producer index is updated to point to the location pointed to by the deleted entry.

20. The computing system of claim 18, wherein when the entry deleted from the producer list is not the first entry in the list, the preceding entry in the producer list is updated to point to the location that was pointed to by the deleted entry.

* * * * *